(12) United States Patent
Lepoutre

(10) Patent No.: US 6,666,232 B2
(45) Date of Patent: Dec. 23, 2003

(54) THERMOFORMED INTAKE DUCT MADE OF NON-WOVEN MATERIAL WITH DOUBLE BENDING

(75) Inventor: Henri Lepoutre, Roubaix (FR)

(73) Assignee: Wecosta (FR)

(*) Notice: Subject to any disclaimer, the term of this patent is extended or adjusted under 35 U.S.C. 154(b) by 0 days.

(21) Appl. No.: 10/273,191

(22) Filed: Oct. 17, 2002

(65) Prior Publication Data
US 2003/0075227 A1 Apr. 24, 2003

(30) Foreign Application Priority Data

Oct. 24, 2001 (FR) .......................................... 01 13738

(51) Int. Cl.⁷ .............................................. F16L 11/00
(52) U.S. Cl. ................. 138/119; 138/121; 138/DIG. 11
(58) Field of Search ................... 138/119, 121, 138/122, DIG. 11

(56) References Cited

U.S. PATENT DOCUMENTS

| 1,350,073 A |   | 8/1920 | Dow |  |
|---|---|---|---|---|
| 2,143,960 A | * | 1/1939 | Stalter et al. | 138/119 |
| 2,157,564 A | * | 5/1939 | Peuthert | 138/121 |
| 2,406,838 A | * | 9/1946 | Kepler | 138/121 |
| 3,578,777 A | * | 5/1971 | DeGain | 138/121 |
| 3,605,817 A | * | 9/1971 | Bauman et al. | 138/121 |
| 5,305,799 A | * | 4/1994 | Dal Palu | 138/109 |
| 5,564,472 A | * | 10/1996 | Gipperich | 138/121 |
| 5,706,864 A | * | 1/1998 | Pfleger | 138/121 |
| 5,792,532 A | * | 8/1998 | Pfleger | 138/121 |
| 6,021,816 A | * | 2/2000 | Jeltsch et al. | 138/121 |
| 6,056,018 A | * | 5/2000 | Renaud | 138/121 |
| 6,102,078 A | * | 8/2000 | Kramer, Jr. | 138/122 |

FOREIGN PATENT DOCUMENTS

| CH | 658 702 | 11/1986 |
| DE | 42 12 807 | 10/1993 |
| DE | 195 48 340 | 12/1996 |
| EP | 1 070 843 | 1/2001 |
| JP | 61032741 | 2/1986 |

* cited by examiner

Primary Examiner—James Hook
(74) Attorney, Agent, or Firm—Renner, Kenner, Greive, Bobak, Taylor & Weber

(57) ABSTRACT

Thermoformed intake duct (1) made of non-woven material and including flanges (6, 7, 8, 9) parallel to the longitudinal axis of the duct, projecting from the outer surface of the duct, a first portion (4) of the duct being formed in the form of a first bellows, a first bellows-shaped portion (4) having two longitudinal flanges (6, 7) diametrically opposed along a first diameter (D2), characterized in that the duct includes at least a second bellows-shaped portion (5) having two longitudinal flanges (8, 9) diametrically opposed along a second diameter (D3) of the duct which makes, with respect to the first diameter (D2) of the two flanges (6, 7) of the first bellows-shaped portion, a non-zero angle, and especially 90°.

6 Claims, 1 Drawing Sheet

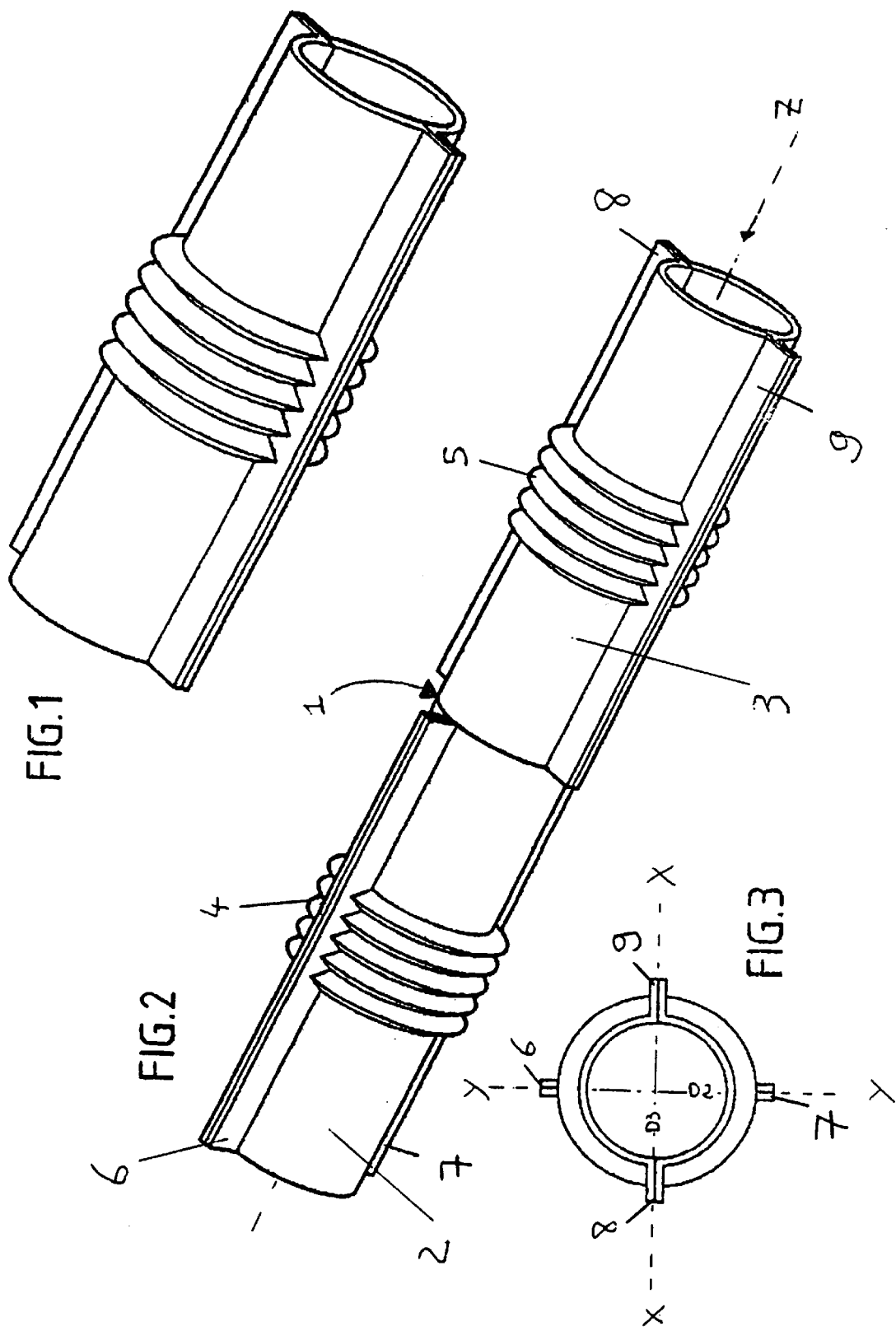

THERMOFORMED INTAKE DUCT MADE OF NON-WOVEN MATERIAL WITH DOUBLE BENDING

BACKGROUND ART

The present invention relates to a duct produced from non-woven material by thermoforming, especially an air intake duct for an internal-combustion engine. This type of duct formed by thermoforming is produced by welding, longitudinal edge to longitudinal edge, two semicylinders by means of two flanges projecting from the outer surface of the semicylinders. It is often necessary to form, at a certain point along the longitudinal extension of this type of duct, a portion of the duct in the form of bellows. In the conventional designs of cylindrical ducts, these bellows allow the duct to bend along any bending axis, whether in the XZ plane or YZ plane, Z being defined as the longitudinal axis of the cylinder and X, Y defining a transverse plane. However, with ducts formed by compression moulding, by welding two semicylinders edge to edge along the two longitudinal flanges projecting from the outer surfaces of the two semicylinders, the bending in the plane parallel to the plane in which the two flanges lie, that is to say a twist with respect to an axis perpendicular to the plane in which the two flanges lie, is no longer possible because of the stiffness of the two flanges.

As a result, for example in the case of an intake duct, it is more difficult to install this type of intake duct and the path along which it is installed must in particular be less complex. This is because it is less easy to follow sinuous trajectories.

DISCLOSURE OF THE INVENTION

The present invention aims to overcome this drawback by providing a duct formed by compression moulding, made of non-woven material, especially polyester, which although being formed by compression moulding and having two longitudinal flanges projecting from its upper surface, may however be bent with respect to any bending axis.

According to the invention, the thermoformed intake duct made of non-woven material and including flanges parallel to the longitudinal axis of the duct, projecting from the outer surface of the duct, a first portion of the duct being formed in the form of a first bellows, a first bellows-shaped portion having two longitudinal flanges diametrically opposed along a first diameter, characterized in that the duct includes at least a second bellows-shaped portion having two longitudinal flanges diametrically opposed along a second diameter of the duct which makes, with respect to the first diameter of the two flanges of the first bellows-shaped portion, a non-zero angle, and especially 90°.

By thus providing two bellows portions offset with respect to each other, the possibility of bending the duct whether at the first portion, for example for bending it with respect to a given axis, or at the second bellows portion, in order to bend it with respect to the axis in which it was not possible to bend the first portion, may be obtained. The duct with two bellows-shaped portions may thus be bent in any direction and be easily installed in an engined vehicle in the same way as a flangeless intake duct.

According to a preferred embodiment of the invention, two bellows portions are welded together so as to be adjacent, one beside the other.

BRIEF DESCRIPTION OF THE DRAWINGS

An embodiment will now be described, given solely by way of example, of an intake duct according to the invention, with reference to the drawing in which:

FIG. 1 is a perspective view of a duct of the prior art;

FIG. 2 is a perspective view of part of an intake duct according to the invention; and FIG. 3 is a cross-sectional view of FIG. 2.

PREFERRED EMBODIMENT FOR CARRYING OUT THE INVENTION

The duct 1 is formed by joining two ducts 2 and 3 end to end. Each duct 2, 3 is formed by thermoforming a non-woven material, especially polyester. Two semicylinders are formed by compression moulding in a mould and then removed from the mould, and the two semicylinders are welded to each other along their longitudinal edges, by means of two longitudinal flanges 6, 7; 8, 9. The duct 2 is produced with a bellows-shaped part 4. The duct 3 is also produced with a bellows-shaped part 4. When the ducts 2 and 3 are brought end to end, they are positioned in such a way that the diameter D2, that is to say the line in the cross section passing through the two flanges 6, 7 of the duct 2, makes an angle of 90° with the diameter D3 defined by the two flanges 8, 9 of the duct 3. Thus, the intake duct can be bent in the X, Z plane at the bellows 4 of the first duct 2, while it can be bent in the YZ plane at the bellows of the second duct 3.

To obtain even more bending possible and an even better function, it would be conceivable to put together three bellows portions of this kind, no longer offset by 90° but 60° with respect to one another.

The number of bellows is not limited by the present invention. Likewise, a number of ducts with bellows is not limited by the present invention.

The expression "diameter of the two diametrically opposed flanges" is understood to mean an imaginary straight line in the plane of the cross section of the duct extending from one flange to the other. In the case of a circular cylindrical section, this straight line merges with the corresponding diameter. The cross section of the duct may have shapes other than circular, for example square, rectangular, elliptical, diamond, hexagonal, etc., the expression "diametrically opposed" then meaning that the two diameters are joined by an imaginary line dividing the cross section of the duct approximately in two.

What is claimed is:

1. Thermoformed intake duct made of non-woven material and including flanges parallel to the longitudinal axis of the duct, projecting from the outer surface of the duct, a first portion of the duct being formed in the form of a first bellows, a first bellows-shaped portion having two longitudinal flanges diametrically opposed along a first diameter, characterized in that the duct includes at least a second bellows-shaped portion having two longitudinal flanges diametrically opposed along a second diameter of the duct which makes, with respect to the first diameter of the two flanges of the first bellows-shaped portion, a non-zero angle.

2. Duct according to claim 1, wherein the two bellows portions are welded together so as to be adjacent, one beside the other.

3. Duct according to claim 2, wherein said non zero angle is 90°.

4. Duct according to claim 1, wherein said non zero angle is 90°.

5. Duct according to claim 1, wherein said flanges are present along the entire length of the duct.

6. Duct according to claim 1, wherein said flanges are flat shaped.

* * * * *